United States Patent
Kreh

(10) Patent No.: US 6,812,446 B2
(45) Date of Patent: Nov. 2, 2004

(54) AUTOFOCUS MODULE FOR MICROSCOPE-BASED SYSTEMS

(75) Inventor: Albert Kreh, Solms (DE)

(73) Assignee: Leica Microsystems Semiconductor GmbH, Wetzlar (DE)

( * ) Notice: Subject to any disclaimer, the term of this patent is extended or adjusted under 35 U.S.C. 154(b) by 0 days.

(21) Appl. No.: 10/625,464

(22) Filed: Jul. 23, 2003

(65) Prior Publication Data

US 2004/0135061 A1 Jul. 15, 2004

(30) Foreign Application Priority Data

Jul. 30, 2002 (DE) .......................... 102 34 757

(51) Int. Cl.$^7$ .................. G02B 27/40; G02B 27/64; G02B 7/04
(52) U.S. Cl. .................... 250/201.3; 250/201.4
(58) Field of Search .................. 250/201.3, 201.4, 250/201.2, 201.5, 201.7, 201.8; 356/601, 609; 359/368, 381, 385

(56) References Cited

U.S. PATENT DOCUMENTS

| 4,595,829 A | 6/1986 | Neumann et al. ............ 250/201 |
| 5,270,527 A | 12/1993 | Salzmann ................. 250/201.3 |

FOREIGN PATENT DOCUMENTS

| DE | 32 19 503 C2 | 12/1983 | ............ G02B/7/11 |
| DE | 41 33 788 A1 | 4/1993 | ............ G02B/7/36 |
| EP | 0 124 241 B1 | 11/1988 | ......... G02B/21/100 |

Primary Examiner—Thanh X. Luu
Assistant Examiner—Seung C. Sohn
(74) Attorney, Agent, or Firm—Houston Eliseeva LLP

(57) ABSTRACT

An autofocus module (30) for a microscope-based system (1) is equipped in such a way that a light source (31) which generates a measurement light bundle (32) is provided. A first axicon (34a) generates an eccentrically extending annularly divergent measurement light beam bundle (32a). A second axicon (34a) is provided in order to parallelize the remitted divergent measurement light beam bundle (32b). A differential diode (42) is mounted in the module (30) for determination of the focus position.

11 Claims, 4 Drawing Sheets

AUTOFOCUS MODULE FOR MICROSCOPE-BASED SYSTEMS

CROSS REFERENCE TO RELATED APPLICATIONS

This application claims priority of the German patent application 102 34 757.3-51 which is incorporated by reference herein.

FIELD OF THE INVENTION

The invention concerns an autofocus module for a microscope-based system. The invention concerns in particular an autofocus module for a microscope-based system having an objective that defines an image beam path which is perpendicular to a surface of a specimen and can be focused thereonto, and having an illumination beam path that encompasses a light source for illumination of the specimen.

BACKGROUND OF THE INVENTION

German Patent DE 32 19 503 discloses an apparatus for automatic focusing onto specimens to be viewed in optical devices. After reflection at the surface of a specimen, the reflected measurement light beam bundle passes through a pinhole after reflection at a splitter mirror. A portion of the measurement light beam bundle is reflected out by means of a fully mirror-coated surface, and after passing through a slit aperture is directed onto a differential diode. In the focused state, the focus is located between the two diodes. In the event of defocusing, the measurement spot drifts onto one of the two diodes, which are connected to corresponding control means. The control means adjust optical or mechanical means of the microscope in order to bring the measurement spot back between the two diodes and thus reestablish the focus position.

European Patent Application EP-A-0 124 241 discloses a microscope having an automatic focusing device. The microscope encompasses a memory device for saving the data from the objectives that are used in the microscope. Also provided is a control device which monitors and regulates the various microscope functions. Another of the tasks of the control device is to move the focusing stage. A CCD element, which receives an image from the particular selected objective and, together with a computation unit, determines the image sharpness based on optimum contrast, is provided as the image acquisition device. The objective data of the objective presently in use must be taken into account when determining the optimum sharpness. Those data are, as mentioned above, stored in a memory.

German Unexamined Application DE 41 33 788 furthermore discloses a method for autofocusing of microscopes, and an autofocus system for microscopes. The image of a specimen or of a pattern reflected onto the specimen is conveyed to two areas on a detector or to two different detectors; in the focused position, one image is produced in front of one detector, and one image behind the other detector. The image sharpness states on the detectors are converted into electronic signals, whose difference is used to focus the objective. The distances of the image or of the respective pattern from the respective detectors are adjustable. Deliberate offset settings, as well as "IR offset" correction settings, can be implemented.

A problem in the context of automatic focusing in microscopes in the semiconductor industry is that with small focus spots, the location of the focus spot is important. For example, if the focus spot is located on an elevation of the topology, focusing occurs there. If the focus spot is located, for example, in a valley of the topology, focusing occurs onto the valley. It is self-evident that different images are acquired depending on the focus position. This has a negative effect in terms of digital image processing, however, since it can happen that images which do not reproduce the optimum information content are processed.

SUMMARY OF THE INVENTION

It is accordingly the object of the present invention to create an autofocus module for a microscope-based system with which optimum and automatic focusing can be achieved regardless of the particular topology of the specimen being examined.

The object is achieved by way of an autofocus module for a microscope-based system which comprises:
- an objective that defines an image beam path which is perpendicular to a surface of a specimen and can be focused thereonto, and an illumination beam path that encompasses a light source for illumination of the specimen,
- a light source that generates a measurement light bundle for determining at least one focus position;
- an optical element for splitting the measurement light bundle in such a way that an eccentrically extending annularly divergent measurement light bundle is created; and for parallelizing a divergent measurement light bundle remitted from the microscope-based system;
- a first dichroic beam splitter positioned in the image beam path of the microscope-based system, for coupling the eccentrically extending measurement light bundle eccentrically into the microscope-based system and for directing it onto the surface of the specimen; and
- at least one optical means for directing the remitted measurement light beam bundle onto a differential diode.

The use is particularly advantageous because the eccentrically extending measurement beam bundle is shaped into a ring and thus covers a larger area on the specimen. The determination of the focus position is thus averaged over several different topological locations. The focus is thus set regardless of the changing topology in one region of the specimen. In addition, the differential diode comprises a first and a second diode. From the distribution of intensities that are measured on the two diodes, conclusions can be drawn as to the focus position. The motion of the focus spot on the differential diode yields the direction of motion of the surface of the specimen relative to the optimum focus position. A computer or control system is provided so that based on the data from the differential diode, the surface of the specimen can be brought automatically into the optimum focus position.

BRIEF DESCRIPTION OF THE DRAWINGS

Further advantages and advantageous embodiments are the subject matter of the description below of the Figures, in whose presentation accurately scaled reproduction was dispensed with in favor of clarity. In the individual drawings.

DETAILED DESCRIPTION OF THE INVENTION

Figure 1:
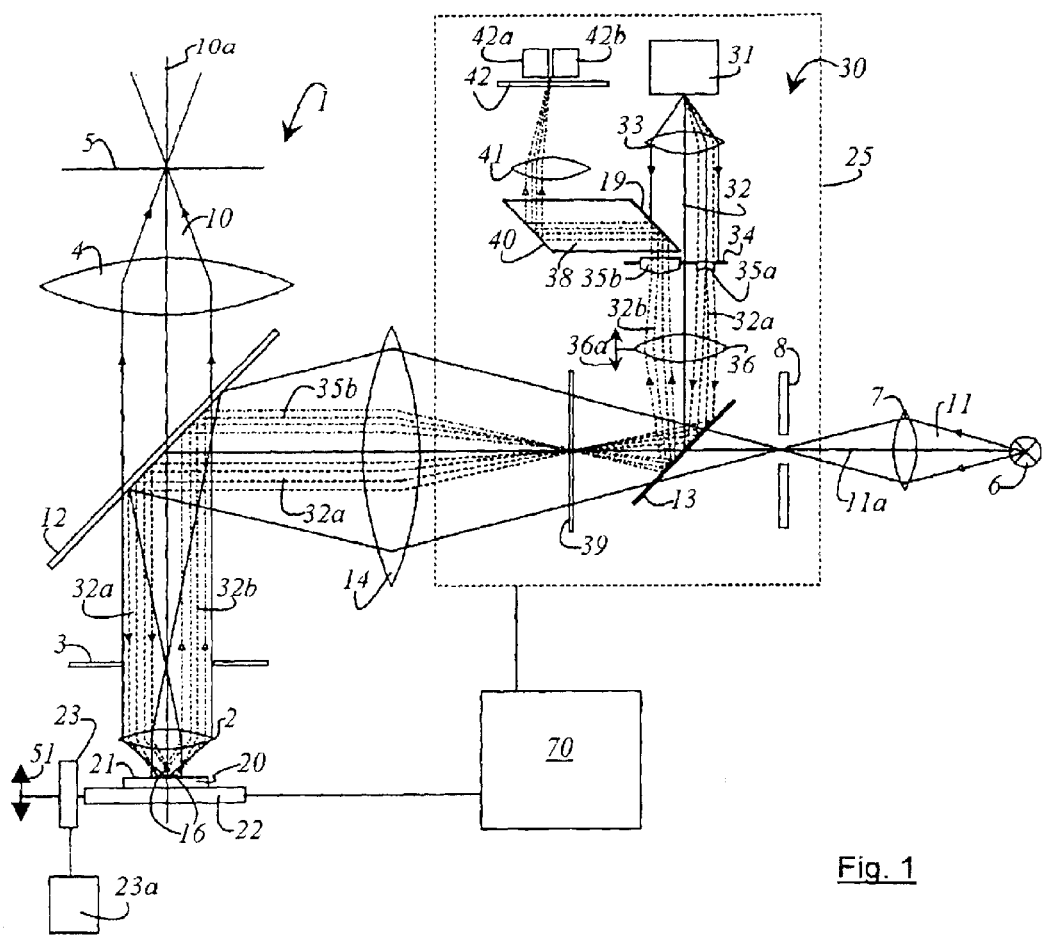
FIG. 1 is a partial side view of the beam paths of an optical device or a microscope-based-system to which an autofocus module is attached.

FIG. 1 depicts a vertically extending image beam path 10 of a microscope-based system 1. Image beam path is arranged symmetrically about an optical axis 10a. Microscope-based system 1 comprises a light source 6 which emits light into illumination beam path 11. Microscope-based system 1 serves to illuminate a specimen 20 which defines a surface 21 that is located in the focal plane of microscope-based system 1. Specimen 20 is located on a microscope stage 22 that can be displaced vertically by a motor 23. The light of illumination beam path 11 first passes through an objective 2 and strikes surface 21 of specimen 20. A certain portion of the light is reflected from surface 21 of specimen 20 and passes first through an objective pupil 3. The beam reflected from surface 21 of specimen 20 passes, in image beam path 10, through a dichroic splitter mirror 12 that has a 50:50 ratio in the visible region and high reflectivity in the IR. The light of image beam path 10 then traverses a tube lens 4, and an image of specimen 20 is generated in intermediate image plane 5. The light in image beam path 10 then travels to an eyepiece (not depicted).

In the situation depicted, illumination beam path 11 of the microscope-based system extends horizontally. Light of illumination beam path 11 emerges from a light source 6. After leaving an optical system 7, the light passes through an aperture stop 8 in whose plane is arranged a pinhole slider (not depicted) that contains at least two pinholes of differing dimensions. With this pinhole slider, an aperture stop 8 adapted to the measurement with the microscope-based system can be inserted, in manual or motorized fashion, with position response. The light of illumination beam path 11 then passes through a second dichroic beam splitter 13 which has the greatest possible transmissivity for the visible light coming from light source 6, and the greatest possible reflectivity for IR light. A mark whose function is explained below is located in the plane of field diaphragm 9. After passage through a lens 14, the light of illumination beam path 11 strikes first dichroic beam splitter 12, from which the reflected portions are deflected toward specimen 20.

A laser autofocus system, which in the exemplary embodiment depicted here is combined with all the necessary optical components into a module 30, is provided for adjusting the focus. Module 30 is surrounded by a housing 25 that is depicted symbolically in FIG. 1 as a dashed-line box. Module 30 can be inserted, for example, into an existing optical illumination system such as the one described for incident-light microscopes e.g. in German Utility Model 79 17 232, snap-lock means known per se ensuring accurately aligned positioning of module 30 in illumination beam path 11.

A (preferably pulsed) laser light proceeds from a laser light source 31 that, in the embodiment depicted, is embodied as a laser diode. Advantageously, IR light is used as the measurement light, since it does not have a disruptive influence on the microscopic image of specimen 20. A measurement light bundle 32 is collimated via a stationary lens 33. An optical element 35 is provided at the level of a pupil 34. In the embodiment shown in FIG. 1, optical element 35 comprises a first and a second axicon 35a and 35b. Measurement light bundle 32 split by first axicon 35a into an annularly divergent beam bundle 32a and then directed, via a lens 36 that can be shifted in manual or motorized fashion in the axial direction as indicated by dashed double arrow 36a, onto second dichroic beam splitter 13, which is arranged at the optical interface of annularly divergent beam bundle 32a and illumination beam path 11. An image of laser light source 31 is generated in the intermediate image plane in which a field diaphragm 39 is positioned.

Laser light source 31 is imaged onto surface 21 of specimen 20 in an annular measurement spot 16. One half of pupil 34 is covered so that in the event of defocusing, the annular measurement spot 16 drifts on surface 21 of specimen 20. The geometric covering of one half of measurement light bundle 32 is achieved using a combined optical component, for example a deflection prism 38, which is inserted halfway into measurement light bundle 32 at the level of pupil 34. Deflection prism 38 contains a fully mirror-coated prism surface 19. The portion of measurement light bundle 32 that is not prevented from propagating by the arrangement of deflection prism 38 is labeled in FIG. 1 with the reference character 32a. With eccentrically extending measurement light bundle 32a of illumination-side measurement light bundle 32, eccentrically extending portion 32a therefore proceeds into objective pupil 3 (substantially) parallel to image beam path 10 of microscope-based system 11.

After reflection at surface 21 of specimen 20, remitted measurement light beam bundle 32b passes through al lens 14, and after reflection at second dichroic splitter mirror 13, the light of remitted measurement light bundle 32b once again strikes lens 36 that is movable in the axial direction as indicated by dashed double arrow 36a. This is that half of pupil 34 that is not illuminated by annularly divergent beam bundle 32a. Here remitted measurement light beam bundle 32b strikes a second axicon 35b that converts the divergent remitted measurement light beam bundle 32b back into a parallel beam. Remitted measurement light beam bundle 32b is then reflected out of illumination-side measurement light bundle 32 by means of fully mirror-coated surface 19 of deflection prism 38. After total reflection at prism surface 40 and after passing through an optical system 41, remitted measurement light beam bundle 32b strikes a differential diode that comprises a first and a second diode 42a and 42b. In the focused case, remitted measurement light beam bundle 32b is focused onto one spot on diodes 42a and 42b. Components of similar function are also usable instead of deflection prism 38 that is depicted, and indeed instead of the other individual optical, mechanical, and optoelectronic components discussed.

Figure 2:
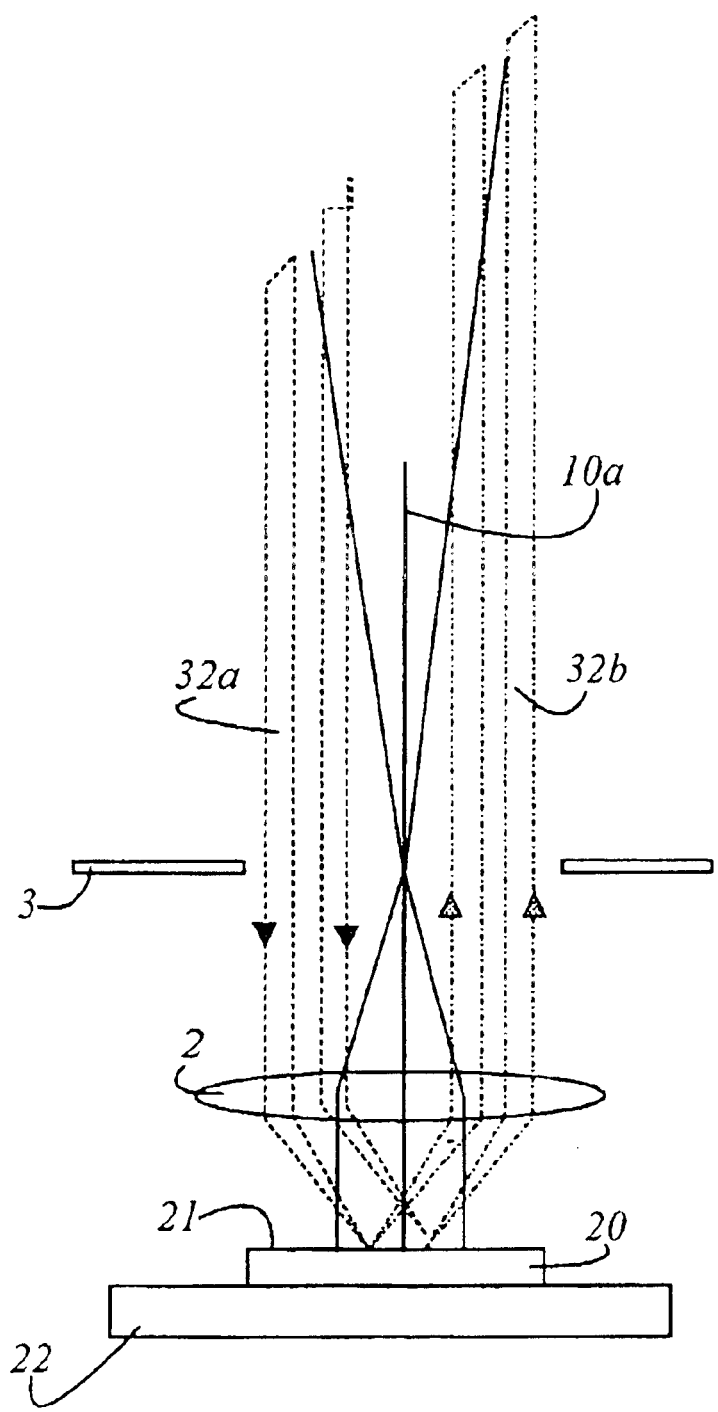
FIG. 2 is a detail view of the measurement light beam bundle striking the measurement sensor.

FIG. 2 is a detail view of the measurement light striking the surface of the specimen. Measurement light bundle 32 is split, by first axicon 35a provided in module 30, into an annularly divergent beam bundle 32a. Annularly divergent beam bundle 32a strikes surface 21 of specimen 20 in corresponding fashion. The focus of annularly divergent beam bundle 32a is distributed symmetrically about optical axis 10a of microscope-based system 1. Remitted measurement light beam bundle 32b is likewise of annular configuration. The divergent remitted measurement light beam bundle 32b is converted back into a parallel beam by second axicon 35b provided in module 30.

Figure 3A:
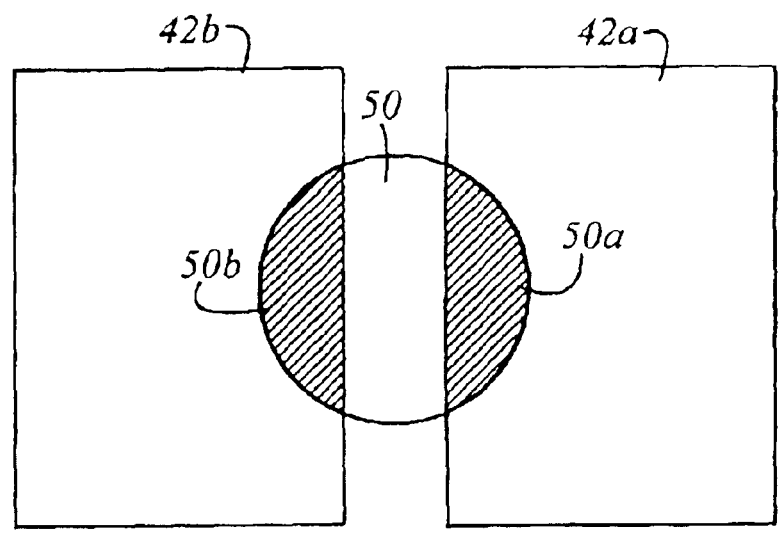
FIG. 3a shows the location and shape of the remitted measurement light beam bundle on the diodes when in focus.

FIG. 3a shows the location and shape of remitted measurement light beam bundle 32b on diodes 42a and 42b when in focus. If the surface of microscope-based system 1 is in the focused state, remitted measurement light beam bundle 32b generates a light spot 50 which covers areas 50a and 50b on first diode 42a and second diode 42b, respectively, that are identical. This means the measured light intensities determined on first and on second diode 42a and 42b are identical.

Figure 3B:
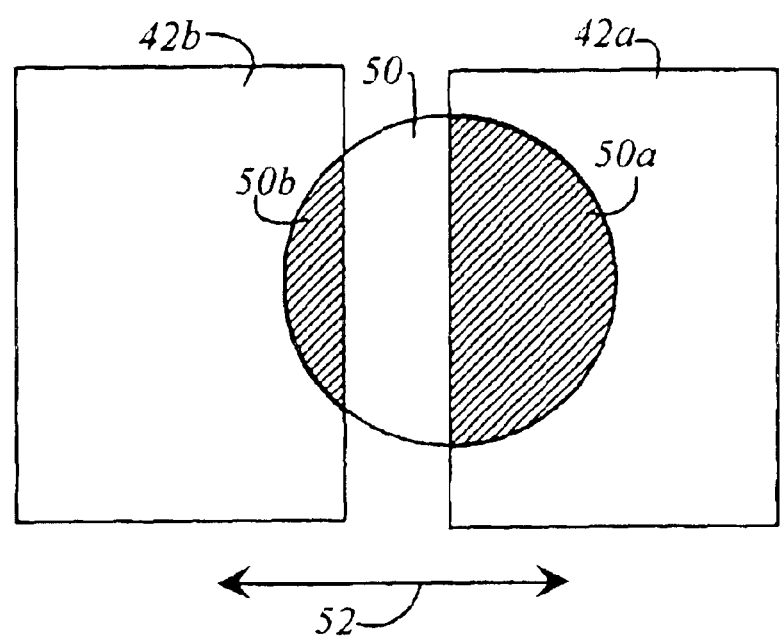
FIG. 3b shows the location and shape of the remitted measurement light beam bundle on the diodes when out of focus.

FIG. 3b shows the location and shape of remitted measurement light bundle 32b on diodes 42a and 42b when out of focus. If surface 21 of specimen 20 moves in the direction of double arrow 51, as depicted in FIG. 1, that motion causes light spot 50 to inflate and additionally causes light spot 50 to drift on diodes 42a and 42b. This consequently results in different light intensities measured on diodes 42a and 42b. In addition, it is possible to deduce the motion of specimen 20 from travel direction 52 (see double arrow in FIG. 3b). From the data related to first and second diode 42a and 42b, a computer 70 (see FIG. 1) determines the displacement of surface 20 of the specimen so as thereby to obtain optimum focus. In addition, computer 70 can quickly and accurately bring back into focus a specimen that has drifted out of focus. Another possibility for obtaining, from the light intensities measured by diodes 42a and 42b, a control signal for achieving a focus position is to generate a difference signal from the comparison of the two intensities identified by diodes 42a and 42b. That difference signal can be used directly for control purposes without a computer. The focus can be adjusted, for example, by means of a motor 23 (DC motor) that actuates the Z drive of a microscope stage 22. Motor 23 is connected to an output section 23a that receives the difference signal directly from diodes 42a and 42b. In output section 23a, the difference signal is amplified and is conveyed to motor 23 for control purposes and to adjust the focus.

Figure 4A:
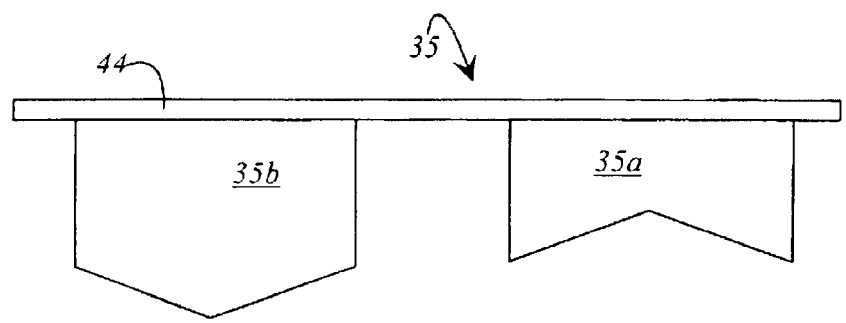
FIG. 4a shows a first embodiment of the optical element.
Figure 4B:
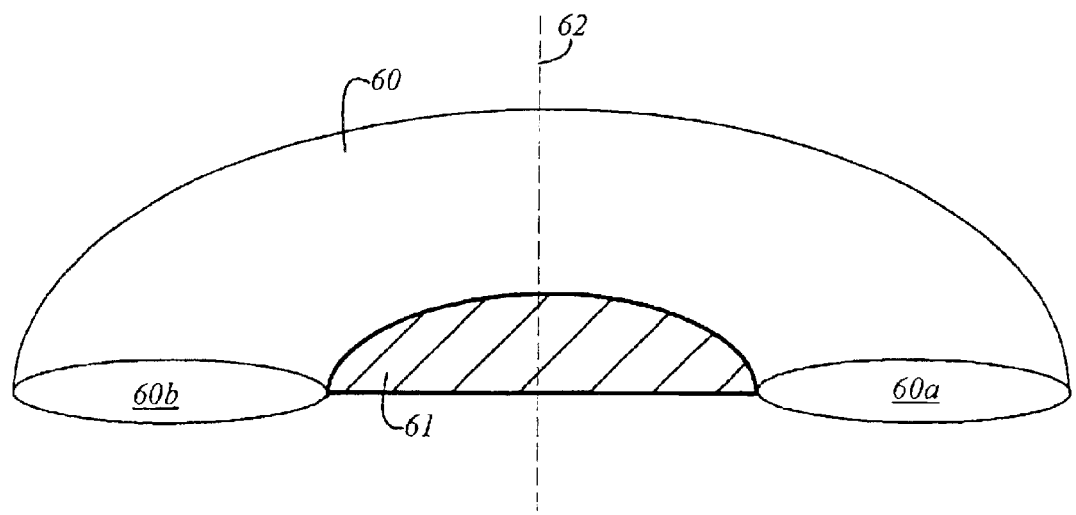
FIG. 4b shows a second embodiment of the optical element.

As depicted in FIG. 4a, according to a first exemplary embodiment optical element 35 comprises a first and a second axicon 35a and 35b. First and second axicon 35a and 35b are mounted on a glass plate 44 as support. First axicon 35a acts on eccentrically extending measurement light beam bundle 32a, and second axicon 35b acts on remitted measurement light beam bundle 32b. The exemplary embodiment of FIG. 4b shows a toroidal lens 60 as optical element 35. Toroidal lens 60 is a lens element that is curved into a ring. The opening of the ring is equipped with an opaque stop 61. Toroidal lens 60 is divided into a first segment and a second segment 60a and 60b. The division is indicated by a dashed line 62. First segment 60a acts on eccentrically extending measurement light beam bundle 32a, and second segment 60b acts on remitted measurement light beam bundle 32b.

The invention has been described with reference to a particular exemplary embodiment. It is self-evident, however, that changes and modifications can be made without thereby leaving the range of protection of the claims below.

What is claimed is:

1. An autofocus module for a microscope-based system comprising:
   an objective that defines an image beam path which is perpendicular to a surface of a specimen and can be focused thereonto, and an illumination beam path that encompasses a light source for illumination of the specimen,
   a light source that generates a measurement light bundle for determining at least one focus position;
   an optical element for splitting the measurement light bundle in such a way that an eccentrically extending annularly divergent measurement light bundle is created; and for parallelizing a divergent measurement light bundle remitted from the microscope-based system;
   a first dichroic beam splitter positioned in the image beam path of the microscope-based system, for coupling the eccentrically extending measurement light bundle eccentrically into the microscope-based system and for directing it onto the surface of the specimen; and
   at least one optical means for directing the remitted measurement light beam bundle onto a differential diode.

2. The autofocus module as defined in claim 1, wherein the optical means is a prism that has a fully mirror-coated prism surface and a prism surface for total reflection, wherein the mirror-coated prism surface directs an eccentrically extending measurement light bundle out of the measurement light bundle.

3. The autofocus module as defined in claim 1, wherein the optical element has a first and a second axicon.

4. The autofocus module as defined in claim 3, wherein the first axicon shapes the measurement light bundle in such a way that an eccentrically extending annularly divergent measurement light bundle is created; and the second axicon parallelizes a divergent measurement light bundle remitted from the microscope-based system.

5. The autofocus module as defined in claim 1, wherein the optical element is a toroidal lens.

6. The autofocus module as defined in claim 5, wherein the toroidal lens is divided into a first segment and a second segment; and the first segment is configured such that an eccentrically extending annularly divergent measurement light bundle is created from the measurement light bundle; and the second segment is configured such that a divergent measurement light bundle remitted from the microscope-based system is parallelized.

7. The autofocus module as defined in claim 1, wherein the differential diode comprises a first and a second diode.

8. The autofocus module as defined in claim 7, wherein the first and the second diode generate a differential signal that goes directly to an output section which then controls a motor for adjustment of the focus.

9. The autofocus module as defined in claim 1, wherein the laser light source, the differential diode, the optical means, the optical element, a stationary lens, and a second dichroic beam splitter are arranged in a housing that is attached to the microscope-based system.

10. The autofocus module as defined in claim 1, wherein the laser light source emits IR light as the measurement light.

11. The autofocus module as defined in claim 1, wherein the microscope-based system and the autofocus module are connected to a computer or control system.

* * * * *